US008152646B2

(12) United States Patent
Jameson et al.

(10) Patent No.: US 8,152,646 B2
(45) Date of Patent: Apr. 10, 2012

(54) DAMPER WITH TWO-PIECE PLATE CONFIGURATION

(75) Inventors: Jonathan Jameson, Canton, OH (US); Adam Uhler, Sterling, OH (US); Andre Soto, Tallmadge, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 763 days.

(21) Appl. No.: 12/217,996

(22) Filed: Jul. 10, 2008

(65) Prior Publication Data

US 2009/0051087 A1 Feb. 26, 2009

Related U.S. Application Data

(60) Provisional application No. 60/959,319, filed on Jul. 12, 2007.

(51) Int. Cl.
*F16F 15/121* (2006.01)
(52) U.S. Cl. .................................... 464/68.7; 192/3.29
(58) Field of Classification Search .............. 464/66.1, 464/67.1, 68.1, 68.7, 68.8, 84; 192/3.29
See application file for complete search history.

(56) References Cited

U.S. PATENT DOCUMENTS

| 2,476,043 | A | * | 7/1949 | Hogan et al. ............ 464/67.1 X |
| 3,279,217 | A | * | 10/1966 | Fawick .................... 464/67.1 |
| 3,681,939 | A | * | 8/1972 | Timtner et al. ............ 464/84 |
| 4,969,855 | A | | 11/1990 | Graton et al. |
| 5,025,904 | A | | 6/1991 | Graton et al. |
| 5,119,911 | A | | 6/1992 | Bochot et al. |
| 5,511,640 | A | | 4/1996 | Fukunaga |
| 6,142,272 | A | * | 11/2000 | Meisner et al. ............ 192/3.29 |
| 2004/0185940 | A1 | | 9/2004 | Yamamoto et al. |

FOREIGN PATENT DOCUMENTS

DE  44 09 209 A1  9/1994
SU  582423  * 11/1977 .............. 464/67.1

* cited by examiner

*Primary Examiner* — Gregory Binda
(74) *Attorney, Agent, or Firm* — Davidson, Davidson & Kappel, LLC

(57) ABSTRACT

A damper for a torque converter, including: a first plate with at least one first opening; a second plate with at least one second opening; and at least one first spring disposed in the at least one first and second openings and including: a radially inward portion in contact with the at least one first opening; and first and second radially outward ends in contact with first and second sides of the at least one second opening and free of contact with the first plate. In one embodiment, the at least one first opening includes third and fourth sides and the radially inward portion includes first and second radially inward ends in contact the third and fourth sides. In another embodiment, the third and fourth sides are free of contact with the second plate.

16 Claims, 7 Drawing Sheets

DAMPER WITH TWO-PIECE PLATE CONFIGURATION

Priority to U.S. Provisional Patent Application Ser. No. 60/959,319, filed Jul. 12, 2007 is claimed, the entire disclosure if which is hereby incorporated by reference herein.

BACKGROUND OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a damper for a torque converter, in particular a damper with a two-piece plate configuration.

It is known to increase the torque capacity and durability of a damper for a torque converter by: increasing the thickness of components such as the flange and damper plates; increasing the distance between spring windows; improving window geometry; and changing the material of construction for components. The first option undesirably increases the weight, cost, and axial space requirements of the damper. Unfortunately, the second option can unfavorably limit the type of springs usable with the damper or the number of springs in the damper. The third option is focused primarily on the corners of the windows. It is known that greater stresses, which result in reduced strength and durability, are associated with the corners and that the smaller the radii for the corners, the greater the stresses will be. Therefore, the third option attempts to improve corner configuration. However, making corner radii larger can undesirably increase the overall size of the windows, or if the window sizes are not increased, undesirably reduce the size of the springs usable with the windows. Unfortunately, materials that result in greater durability are more costly; therefore, the fourth option undesirably increases the cost of the damper.

It is known to provide stops in a damper to prevent "over travel" of springs in the damper, for example, in response to overload torque received by the damper. The stops prevent the springs from fully compressing. Unfortunately, such stops are provided at the outer circumference of the damper, increasing the radial space required for the damper. Further, the torque received by the stops is transmitted through one or more plates in the damper with spring windows. As noted above, the torque capacity and durability of a damper plate is reduced at window corners. Therefore, transmitting the torque past the windows decreases the torque capacity of the damper or causes undesirable stress on the plates at the corners.

Thus, there is a long-felt need for a damper for a torque converter having increased torque capacity and durability without an increase in weight, size, or cost for the damper. There also is a long-felt need for a damper with stops that minimize torque transfer past spring window corners and that minimize radial space requirements.

BRIEF SUMMARY OF THE INVENTION

The present invention provides a damper for a torque converter, including: a first plate with at least one first opening; a second plate with at least one second opening; and at least one first spring disposed in the at least one first and second openings and including: a radially inward portion in contact with the at least one first opening; and first and second radially outward ends in contact with first and second sides of the at least one second opening and free of contact with the first plate. In one embodiment, the at least one first opening includes third and fourth sides and the radially inward portion includes first and second radially inward ends in contact the third and fourth sides. In another embodiment, the third and fourth sides are free of contact with the second plate.

In a first embodiment, the at least one first spring may be arranged to receive torque from a cover for the torque converter and transmit respective portions of the torque to the first and second plates. In one embodiment, the at least one first spring may be arranged to transmit substantially half of the torque to the first plate. In a second embodiment, the first and second sides may include respective radially inward corners with respective cut out radii at least partially circumferentially aligned with the first and second radially inward ends of the at least one first spring and the portions of the first and second walls in contact with the at least one spring may be substantially straight.

In a preferred embodiment, the torque converter includes a hub and the first and second plates are rotationally connected to the hub. In one embodiment, the damper may includes a third plate arranged to receive overload torque from a cover for the torque converter and to transmit the overload torque to the at least one first spring, the second plate may includes at least one protrusion extending radially outward from an outer circumference of the second plate, and in response to the at least one first spring receiving the overload torque, the second plate is arranged to rotate so that the at least one protrusion transmits the overload torque through the second plate to the hub.

In a third embodiment, the damper includes at least one second spring disposed in the second plate radially inward from the at least one first spring. In one embodiment, the torque converter may includes a hub and the damper may includes a flange in contact with the at least one second spring, rotationally connected to the hub, and with at least one radially extending protrusion disposed in the at least one second opening. In another embodiment, the damper may includes at least one third plate arranged to receive overload torque from a cover for the torque converter and to transmit the overload torque to the second plate, wherein the at least one second spring may be arranged to receive the overload torque from the second plate, and wherein in response to the at least one second spring receiving the overload torque, the second plate is arranged to rotate so that the at least one protrusion rotationally connects to the second plate to transmit the overload torque through the second plate to the flange. In a further embodiment, the at least one radially extending protrusion may be at least partially radially aligned with the at least one spring or the at least one radially extending protrusion may be radially inward of an outer circumference for the first plate.

In a third embodiment, the first and second plates may be connected, the at least one first opening may be at least one cut out opening radially outward at an outer circumference of the first plate and the at least one second opening may be enclosed at an outer circumference for the second plate, a diameter for the first plate is less than a diameter for the second plate, or the at least one opening provides radial support for the at least one first spring.

The present invention also provides a method for assembling a damper for a torque converter.

An object of the present invention is to provide a damper for a torque converter having increased torque capacity and durability without an increase in weight, size, or cost for the damper and to provide a damper with stops that minimize torque transfer past spring window corners and minimize radial space requirements.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
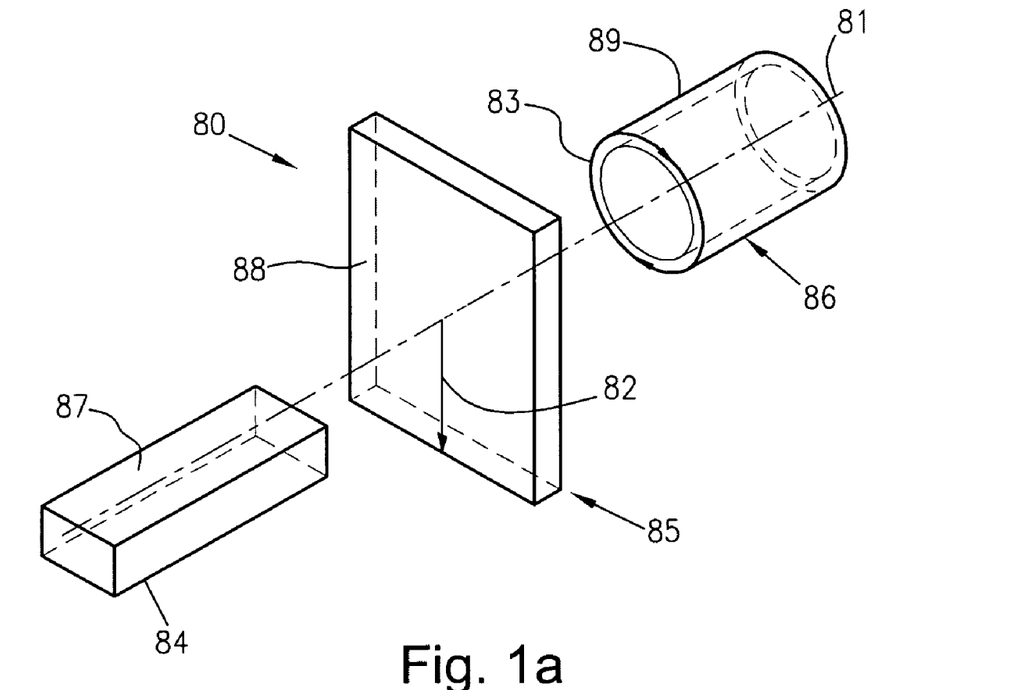
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
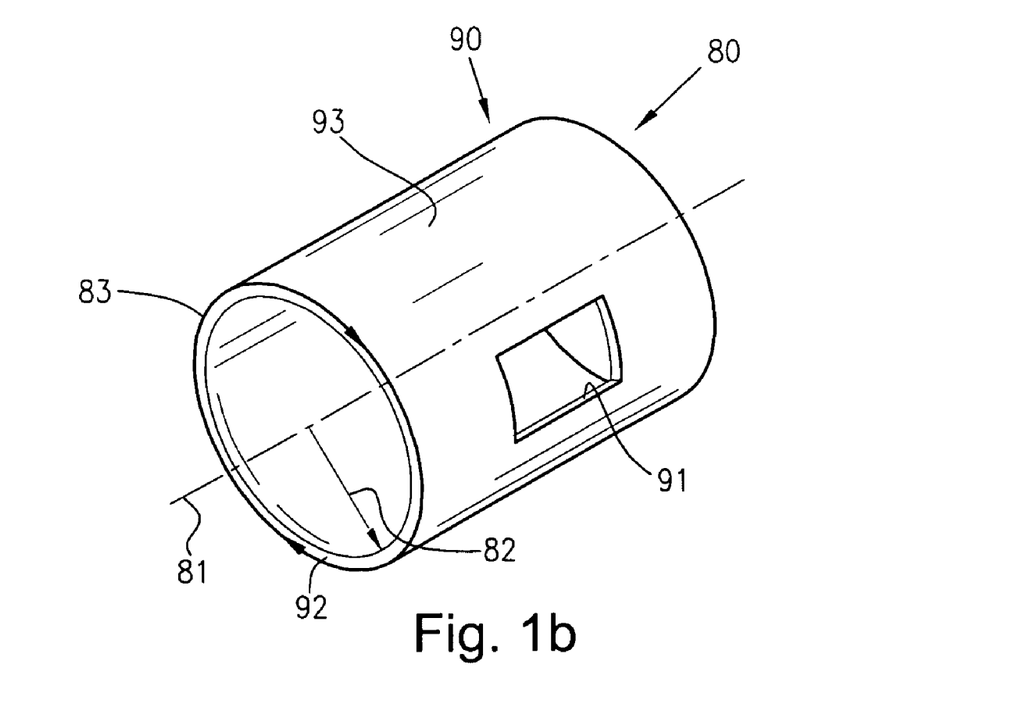
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

In general, and as further described infra, a present invention damper for a torque converter includes a first plate with at least one opening, a second plate with at least one opening, and at least one spring disposed in the openings for the two plates. Each spring includes respective ends located radially inward and radially outward when the springs are disposed in the openings for the plates. The radially inward ends are in contact with the first plate and free of contact with the second plate. The radially outward ends are in contact with the second plate and free of contact with the first plate. The preceding arrangement advantageously transmits and distributes torque, received by the springs, to the first and second plates.

Figure 2:
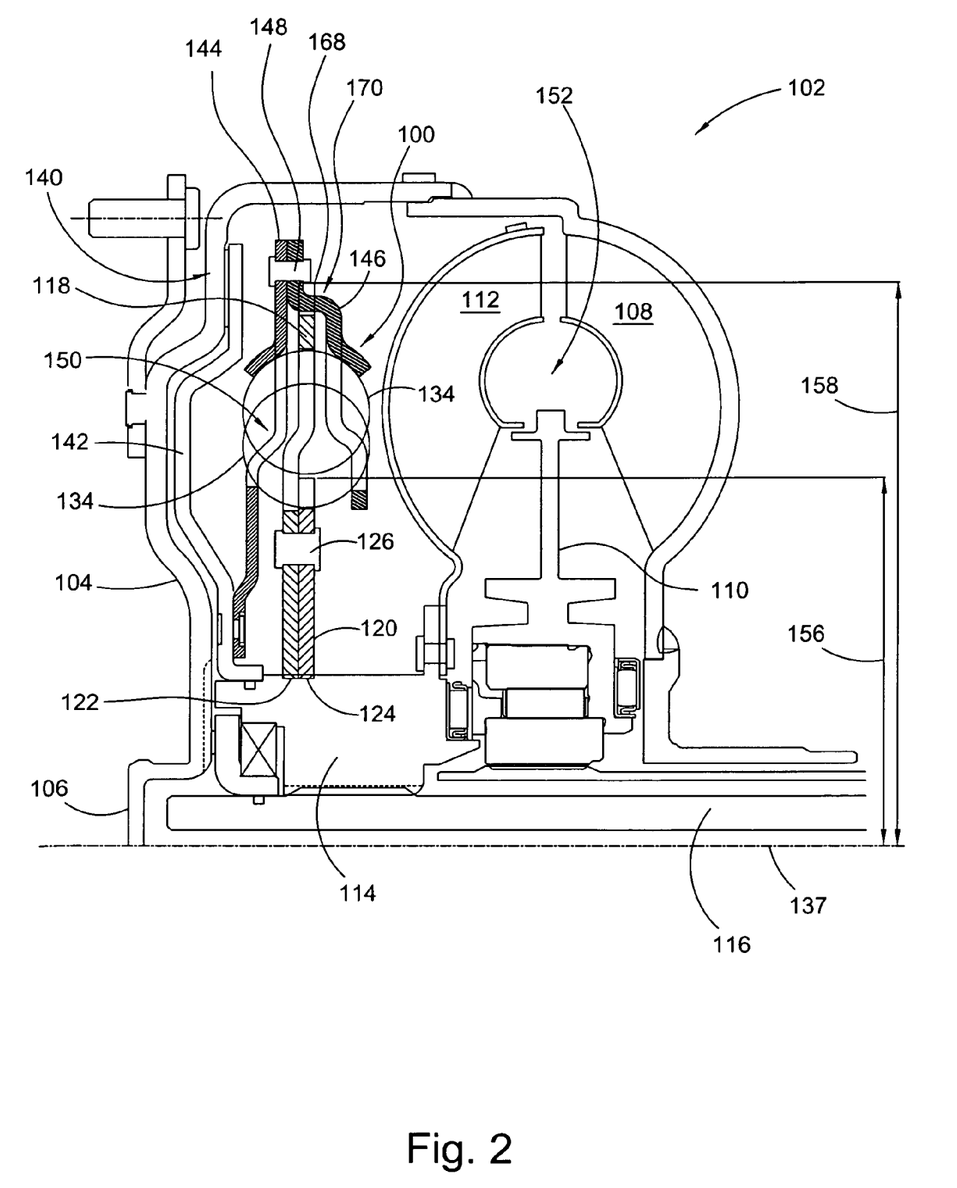
FIG. 2 is a partial cross-sectional view of a present invention damper in a torque converter.

FIG. 2 is a partial cross-sectional view of present invention damper 100 in torque converter 102.

Figure 3:
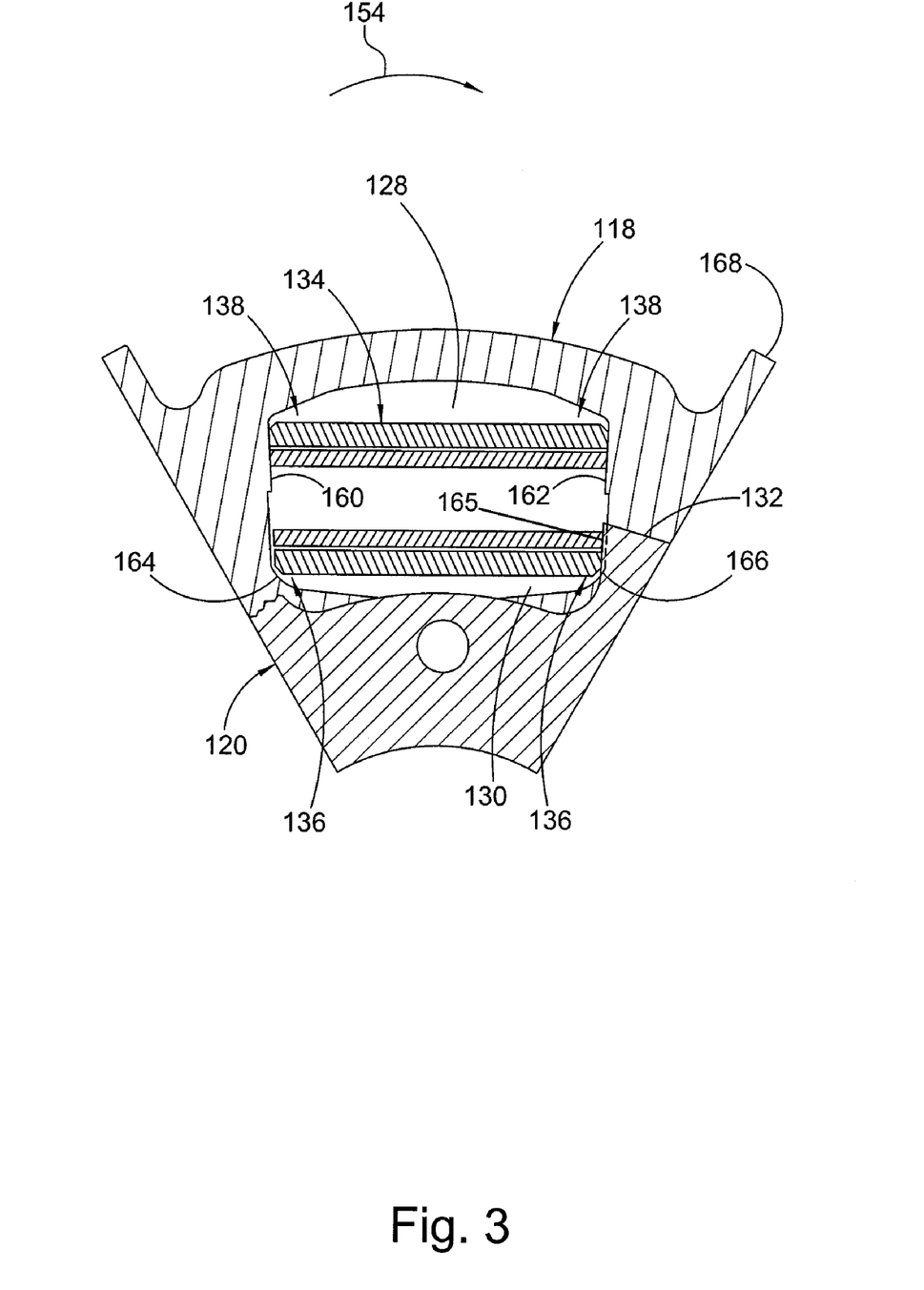
FIG. 3 is a partial back view of the damper shown in FIG. 2 with a portion of the back plate cut away.

FIG. 3 is a partial back view of damper 100 shown in FIG. 2 with a portion of the back plate cut away. The following should be viewed in light of FIGS. 2 and 3.

Torque converter 102 includes a cover 104. Cover 104 has a cover pilot 106. Inside cover 104 is impeller 108, stator 110 and a turbine 112 connected to turbine hub 114. Turbine hub 114 is rotationally connected to an output shaft 116, which can be an input shaft to a transmission, for example. By rotationally connected, or secured, we mean that the turbine and the hub are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra.

Plates 118 and 120 are rotationally connected to the hub by any means known in the art, for example, splines 122 and 124, respectively. In a preferred embodiment, the plates are connected by rivets 126. Plate 118 includes at least one opening 128 and plate 120 includes at least one opening 130. Respective pluralities of openings are shown in the figures. In a preferred embodiment, openings 128 are windows, or fully enclosed openings, and openings 130 are cut outs open to outer circumference 132 of plate 120. At least one spring 134 is disposed in cut outs 128 and openings 130. A plurality of springs is shown in the figures. It should be understood that to clarify the presentation, the symbols used in FIG. 3 for the springs are symbolic in nature and are not meant to literally portray the coil structure of the springs.

Each spring includes respective ends 136 located radially inward with respect to longitudinal axis 137 and respective ends 138 located radially outward with respect to the axis. The radially inward ends are in contact with plate 120 and free of contact with plate 118. The radially outward ends are in contact with plate 118 and free of contact with plate 120.

Torque converter 102 also includes lockup clutch 140 having piston plate 142. Connected to piston plate 142 are coupling plate 144 and a support plate 146 which can be held together by rivets 148. Coupling plate 144 has an axially extending bend 150. Springs 134 are retained by plates 144 and 146. Lockup clutch 140 can be engaged (closed) to transmit torque directly between cover 104 and turbine hub 114, through the damper, that is, bypassing torus 152. Torque flows from piston plate 142 to plates 144 and 146 to springs 134. The torque then is transmitted from the springs to plates 118 and 120. The configuration of damper 100 results in respective portions of the torque being transmitted by the springs to plates 118 and 120. For example, assuming toque is transmitted to plates 144 and 146 in direction 154, springs 134 are compressed in the same direction. Then, a portion of the torque is transmitted to plate 118 via contact with ends 138 and the remainder of the torque is transmitted to plate 120 via contact with ends 136. That is, the torque is divided between the plates for transmission to the hub. In a preferred embodiment, the torque is equally divided between the plates.

Advantageously, dividing the torque between plates 118 and 120 enables, for a damper having the same torque capacity, the respective axial thicknesses of plates 118 and 120 to be reduced. When the torque is equally divided among the two plates, the respective axial thicknesses can be reduced by half. This reduction advantageously reduces the axial space needed for the plates, reduces the cost of the plates, and reduces the mass of the plates. Radius 156 of plate 120 is less than radius 158 of plate 118, further reducing the cost and mass of plate 120 and reducing the radial space needed for plate 120. According, a diameter of plate 120 is less than a diameter of plate 118.

Openings 128 include sides 160 and 162. Side 160 is more visible in the cut away portion of plate 120. Openings 130 each include two sides 165. In FIG. 3, only one side 165 is shown due to the cut away portion. In a preferred embodiment, the sides are substantially straight where ends 136 and 138 contact the sides. Openings 128 also include radially inward corners 164 and 166 for sides 160 and 162, respectively. These corners are necessary to form the windows. To address the problems noted supra regarding the cut out radii for damper plate windows, the respective radii for the corners are advantageously increased (rounded) since ends 136 do not contact sides 160 and 162. Since ends 136 do not contact the sides 160, 162, but instead contact sides 165, the portions of the sides 160, 162 circumferentially aligned with ends 136 do not need to be straight. Thus, the radii of the corners can be expanded so that at least portions of the radii are in alignment with ends 136. Expanding the radii decreases stresses at the corners, increasing the strength, durability, and torque bearing capacity of plate 118.

In another preferred embodiment, plate 118 includes, protrusions extending radially outward, or tabs, 168. The tabs are disposed in respective openings or cut outs 170 of plate 146. In the event that overload torque (torque above the limit for which damper 100 is designed to operate) is transmitted through cover 104 to plates 144 and 146, the torque compresses the springs and rotates plate 118 until the tabs contact plate 146, for example, respective sides of cut outs 170, rotationally connecting plates 118 and 146 so that the overload torque is transmitted directly from plate 146 to plate 118 to the hub, bypassing the springs. The tabs and springs are configured so that the tabs contact plate 146 before the springs are fully compressed, protecting the springs from damage. As noted supra, the lower corners of openings 128 are strengthened by the configuration shown in the figures; therefore, the overload torque bearing capacity and overall durability of plate 118 is increased due to the larger radii of the lower corners.

In a preferred embodiment, one or both of plates 118 and 120 are stamped. In one embodiment, plates 118 and 120 are not connected, for example, by rivets 126. In another embodiment, plate 118 also contacts ends 136.

Figure 4:
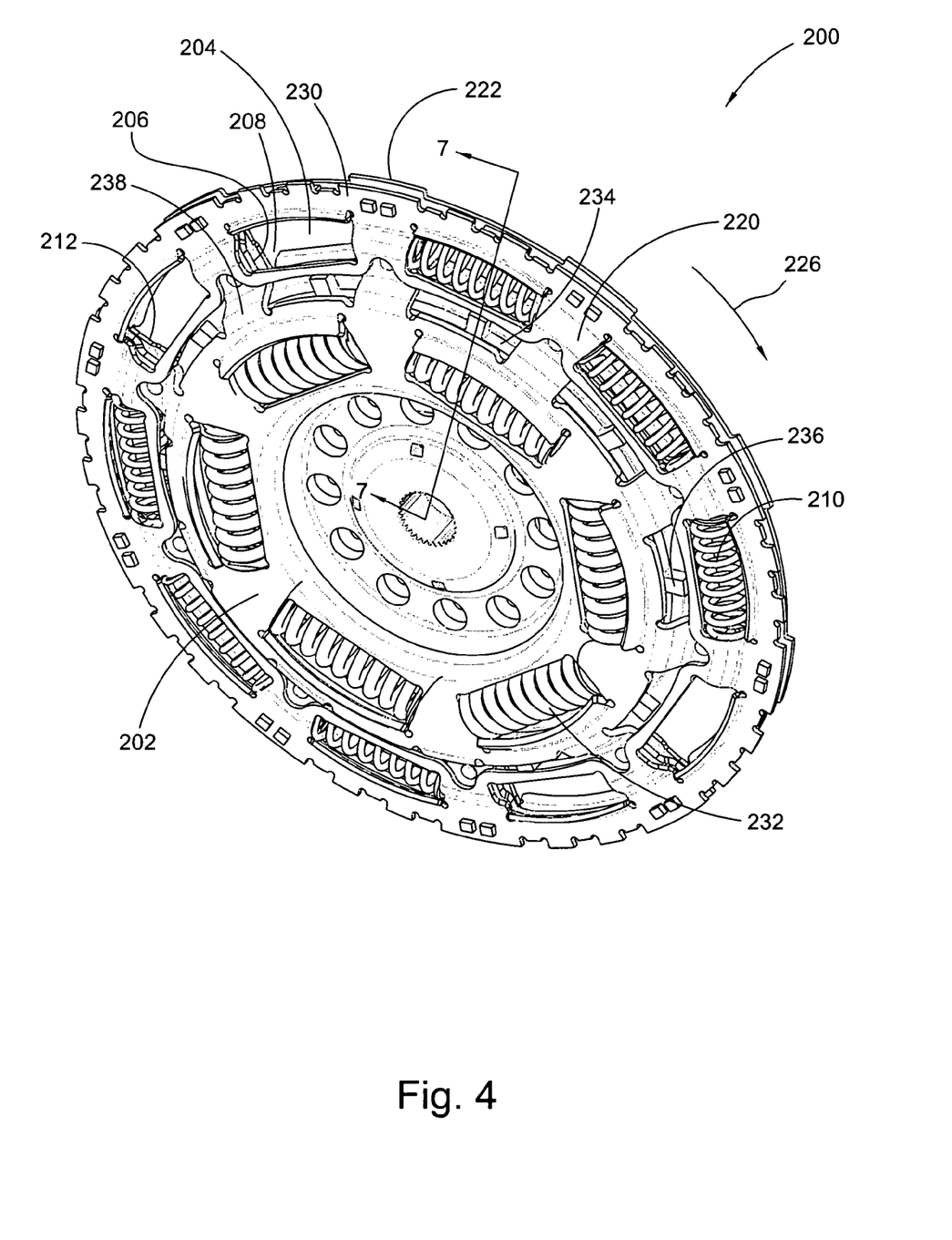
FIG. 4 is a front perspective view of a present invention damper with a portion of the outer radial springs removed.

FIG. 4 is a front perspective view of present invention damper 200.

Figure 5:
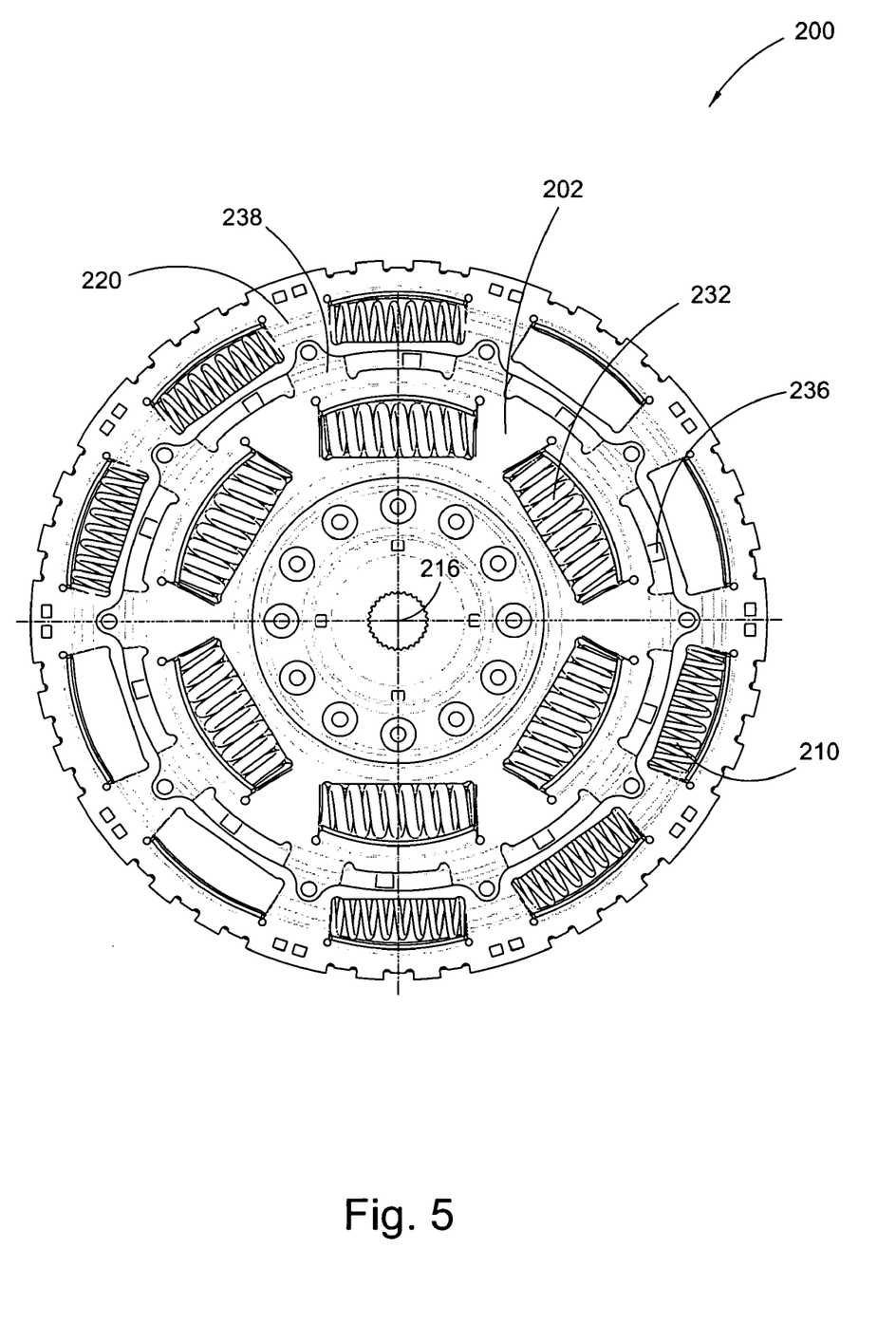
FIG. 5 is a front view of the damper shown in FIG. 4.

FIG. 5 is a front view of a portion of damper 200 shown in FIG. 4.

Figure 6:
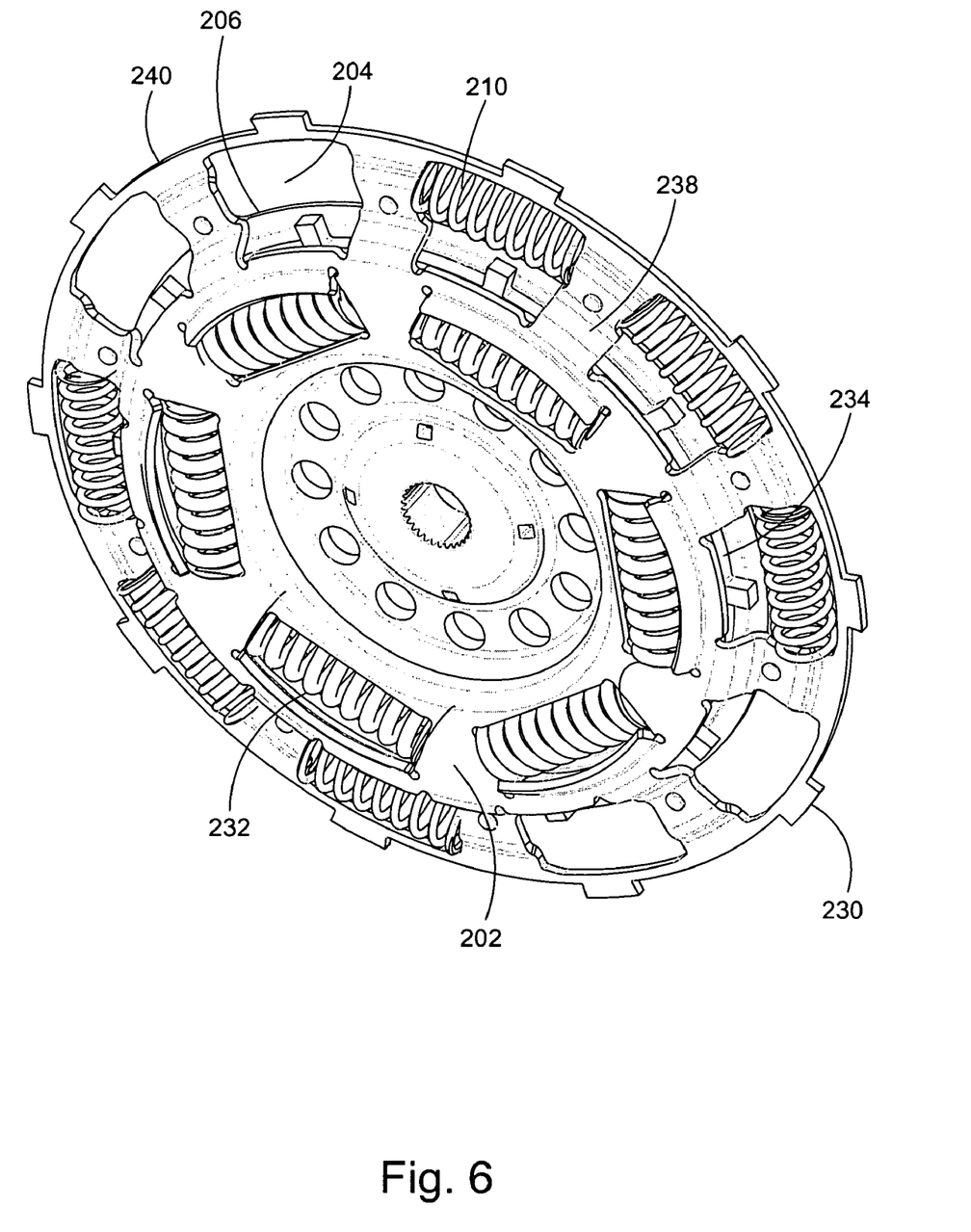
FIG. 6 a front perspective view of the damper shown in FIG. 4 with a cover plate removed; and, FIG. 7 is a partial cross-sectional view of the damper shown in FIG. 4, generally along line 7-7 in FIG. 4.

FIG. 6 is a front perspective view of damper 200 shown in FIG. 4 with a cover plate removed.

Figure 7:
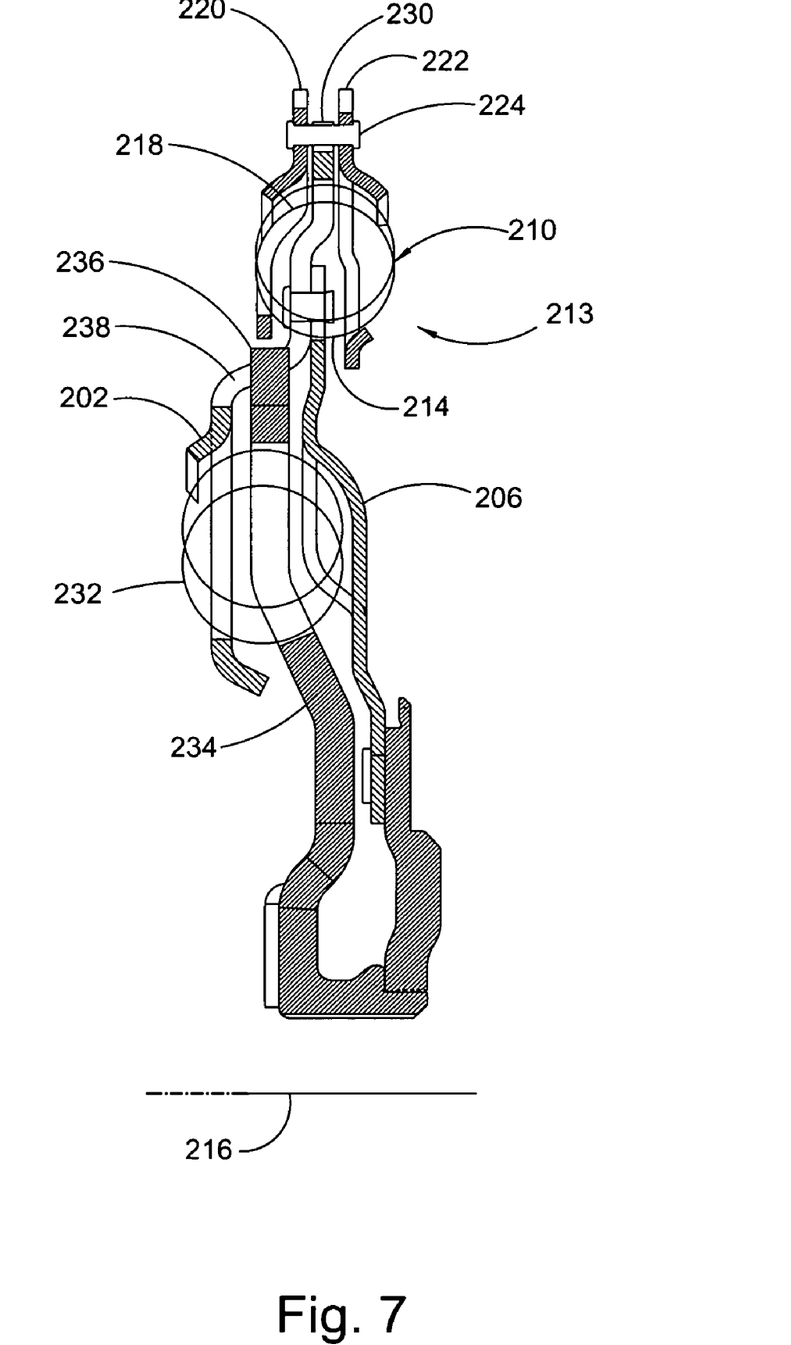

FIG. 7 is a partial cross-sectional view of damper 200 shown in FIG. 4, generally along line 7-7 in FIG. 4. The following should be viewed in light of FIGS. 4 through 7. Damper 200 includes plate 202 with at least one opening 204, plate 206 with at least one opening 208, and at least one spring 210 disposed in the openings. Respective pluralities of openings 204 and 208 and springs 210 are shown in the figures. In a preferred embodiment, openings 204 are windows, or fully enclosed openings, and openings 208 are cut outs opening radially outward at outer circumference 212 of plate 206. Each spring includes radially inward portion 213 with respective ends 214 located radially inward with respect to longitudinal axis 216. Advantageously, openings 208 provide radial support for portions 213 as further described infra. Each spring also includes respective ends 218 located radially outward with respect to the axis. The radially inward ends 214 are in contact with plate 206 at sides of opening 208 and plate 202. The radially outward ends 218 are in contact with plate 202 at sides of opening 204 and free of contact with plate 206.

Cover plates 220 and 222 are rotationally connected by any means known in the art, for example, rivets 224 and, when the damper is installed in a torque converter are arranged to receive torque from a cover for the torque converter. The cover plates transmit the torque to springs 210. The configuration of damper 200 results in respective portions of the torque being transmitted by the springs to plates 202 and 206. For example, assuming toque is transmitted to the cover plates in directions 226, springs 210 are compressed in the same direction. Then, a portion of the torque is transmitted to plate 202 via contact with ends 218 and the remainder of the torque is transmitted to plate 206 via contact with ends 214. That is, the torque is divided between the plates for transmission to the hub. In a preferred embodiment, the torque is equally divided between the plates.

Advantageously, dividing the torque between plates 202 and 206 enables, for a damper having the same torque capacity, the respective axial thicknesses of plates 202 and 206 to be reduced. When the torque is equally divided among the two plates, the respective axial thicknesses can be reduced by half. This reduction advantageously reduces the axial space needed for the plates, reduces the cost of the plates, and reduces the mass of the plates. For those cases in which less than half the torque is transmitted by plate 206, respective plate thicknesses can be reduced according to the portion of the torque transmitted by plate 206.

In another preferred embodiment, plate 202 includes radially outwardly extending protrusions extending, or tabs, 230.

The tabs are circumferentially disposed between rivets 224. In the event that overload torque (torque above the limit for which damper 200 is designed to operate) is transmitted through the cover plates, the cover plates compresses springs 210 and rotate plate 202 until the tabs contact the rivets, rotationally connecting the cover plates and plate 202 so that the overload torque is transmitted directly from the cover plates to plate 202, bypassing springs 210. The tabs and springs 210 are configured so that the tabs contact the rivets before the springs are fully compressed, protecting the springs from damage.

In a further preferred embodiment, damper 200 is a series damper with at least one spring 232 (a plurality of springs 232 is shown in the figures) disposed between plates 202 and 206. The damper further includes flange 234 rotationally connected to the hub and with outwardly extending protrusions extending, or tabs, 236. Tabs 236 are disposed in windows 204. In the event that overload torque (torque above the limit for which damper 200 is designed to operate) is transmitted through the cover plates, tabs 230 lock the cover plates and plate 202, plate 202 rotates until tabs 236 contact plate 202, for example, segment 238, rotationally connecting plate 202 and the flange so that the overload torque is transmitted directly from plate 202 to the flange, bypassing springs 232. Tabs 236 and springs 232 are configured so that the tabs contact plate 202 before the springs are fully compressed, protecting the springs from damage.

Since plate 206 provides support for ends 214, relieving plate 202 of that function, the geometry of plate 202 is advantageously configured so that tabs 236 are at least partially radially aligned with springs 232, reducing the axial space requirements for the damper. Further the configuration of plate 202 places tabs 236 radially inward of outer circumference 240 of plate 202, reducing the radial space requirements for the damper. Since tabs 236 contact segments 238, the overload torque bypasses the corners of windows 204. Since the corners are stress points, the torque capacity of plate 202 is less at the corners. Therefore, by bypassing the corners the overload torque bearing capacity of plate 202 is increased.

The present invention also includes a method for assembling a damper for a torque converter including the steps of: providing a first plate having at least one cut out opening to an outer circumference of the first plate; aligning, with the first plate, a second plate having at least one window enclosed by the second plate and a diameter larger than the first damper plate, so that the at least one window is axially aligned with at least one cut out; and placing at least one spring in the at least one cut out and window so that a radially inward portion of the at least one spring is in contact with the at least one first opening and first and second radially outward ends of the at least one spring are in contact with first and second sides of the at least one second opening and free of contact with the first plate.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A damper for a torque converter, comprising:
a first plate with at least one first opening;
a second plate with at least one second opening; and,
at least one first spring disposed in the at least one first and second openings and including:
  a radially inward portion in contact with the at least one first opening; and,
  first and second radially outward ends in contact with first and second sides of the at least one second opening and free of contact with the first plate,
wherein the at least one first spring is arranged to receive torque from a cover for the torque converter and transmit respective portions of the torque to the first and second plates.

2. The damper as recited in claim 1 wherein the at least one first opening includes a third and a fourth side and the radially inward portion includes a first and a second radially inward end contacting the third and fourth sides.

3. The damper as recited in claim 2 wherein the first and second radially inward ends are free of contact with the second plate.

4. The damper as recited in claim 1 wherein the at least one first spring is arranged to transmit substantially half of the torque to the first plate.

5. The damper as recited in claim 1 wherein the first and second sides include respective radially inward corners with respective cut out radii at least partially circumferentially aligned with first and second radially inward ends of the at least one first spring and wherein the portions of the first and second sides in contact with the at least one spring are straight.

6. The damper as recited in claim 1 wherein the torque converter includes a hub and wherein the first and second plates are rotationally connected to the hub.

7. The damper as recited in claim 6 further comprising a third plate arranged to receive an overload torque from a cover for the torque converter and to transmit the overload torque to the at least one first spring, wherein the second plate includes at least one protrusion extending radially outward from an outer circumference of the second plate, and wherein in response to the at least one first spring receiving the overload torque, the second plate is arranged to rotate so that the at least one protrusion transmits the overload torque through the second plate to the hub.

8. The damper as recited in claim 1 wherein the first and second plates are connected.

9. The damper as recited in claim 1 wherein the at least one first opening is at least one cut out opening radially outward at an outer circumference of the first plate and the at least one second opening is enclosed at an outer circumference of the second plate.

10. The damper as recited in claim 1 wherein a diameter of the first plate is less than a diameter of the second plate.

11. The damper as recited in claim 1 wherein the at least one first opening provides radial support for the at least one first spring.

12. A damper for a torque converter, comprising:
a first plate with at least one first opening;
a second plate with at least one second opening;
at least one first spring disposed in the at least one first and second openings and including:
  a radially inward portion in contact with the at least one first opening, and,
  first and second radially outward ends in contact with first and second sides of the at least one second opening and free of contact with the first plate; and at least one second spring disposed in the second plate radially inward from the at least one first spring.

13. The damper as recited in claim 12 wherein the torque converter includes a hub and the damper includes a flange in contact with the at least one second spring, rotationally connected to the hub, and with at least one radially extending protrusion disposed in the at least one second opening.

14. The damper as recited in claim 13 further comprising at least one third plate arranged to receive an overload torque from a cover for the torque converter and to transmit the overload torque to the second plate, wherein the at least one second spring is arranged to receive the overload torque from the second plate, and wherein in response to the at least one second spring receiving the overload torque, the second plate is arranged to rotate so that the at least one radially extending protrusion rotationally connects to the second plate to transmit the overload torque through the second plate to the flange.

15. The damper as recited in claim 13 wherein the at least one radially extending protrusion is at least partially radially aligned with the at least one second spring.

16. The damper as recited in claim 13 wherein the at least one radially extending protrusion is radially inward of an outer circumference for the first plate.

* * * * *